Oct. 3, 1950      C. P. SIVERTSON      2,524,181
SUPPORT FOR INDIVIDUALS WHILE HARVESTING CROPS
Filed Sept. 24, 1946      2 Sheets-Sheet 1

Inventor
CLIFFORD P. SIVERTSON,

Oct. 3, 1950  C. P. SIVERTSON  2,524,181
SUPPORT FOR INDIVIDUALS WHILE HARVESTING CROPS
Filed Sept. 24, 1946  2 Sheets-Sheet 2

Inventor
CLIFFORD P. SIVERTSON,
By McMorrow, Berman and Davidson
Attorneys

Patented Oct. 3, 1950

2,524,181

UNITED STATES PATENT OFFICE 2,524,181

SUPPORT FOR INDIVIDUALS WHILE HARVESTING CROPS

Clifford P. Sivertson, Washington, D. C.

Application September 24, 1946, Serial No. 699,009

4 Claims. (Cl. 56—327)

My invention relates to a harvester.

An important object of my invention is to provide a harvester of the type in which one or more workers are supported near the ground for picking or harvesting produce, the harvester being particularly adapted for harvesting berries, and other fruits and vegetables, which grow close to the ground.

A further object is to provide a harvester for berries and other produce, designed to facilitate the processing of such produce after picking; and providing such processing operations as cleaning, stemming, grading, and packaging.

A further object is to provide means for delivering freshly harvested fruits and vegetables onto the market within a very short time after picking, and for eliminating considerable handling of the fresh produce, which ordinarily unquestionably damages the quality of the same.

A further object is to provide a harvester for vegetables and fruits which grow close to the ground, which eliminates the necessity of picking the produce prematurely, and allowing the same to ripen artificially after picking.

A further object is to provide means for protecting the pickers or workers from the hazards of heat, dust, insects, acid poisoning and the like, which hazards frequently exists while berries are being harvested.

A still further object of the invention is to provide a harvester having means for adjusting the positions of the supported workers or pickers relative to the rows of berry plants, or the like.

Other objects and advantages of the invention will be apparent during the course of the following description.

Figure 1:
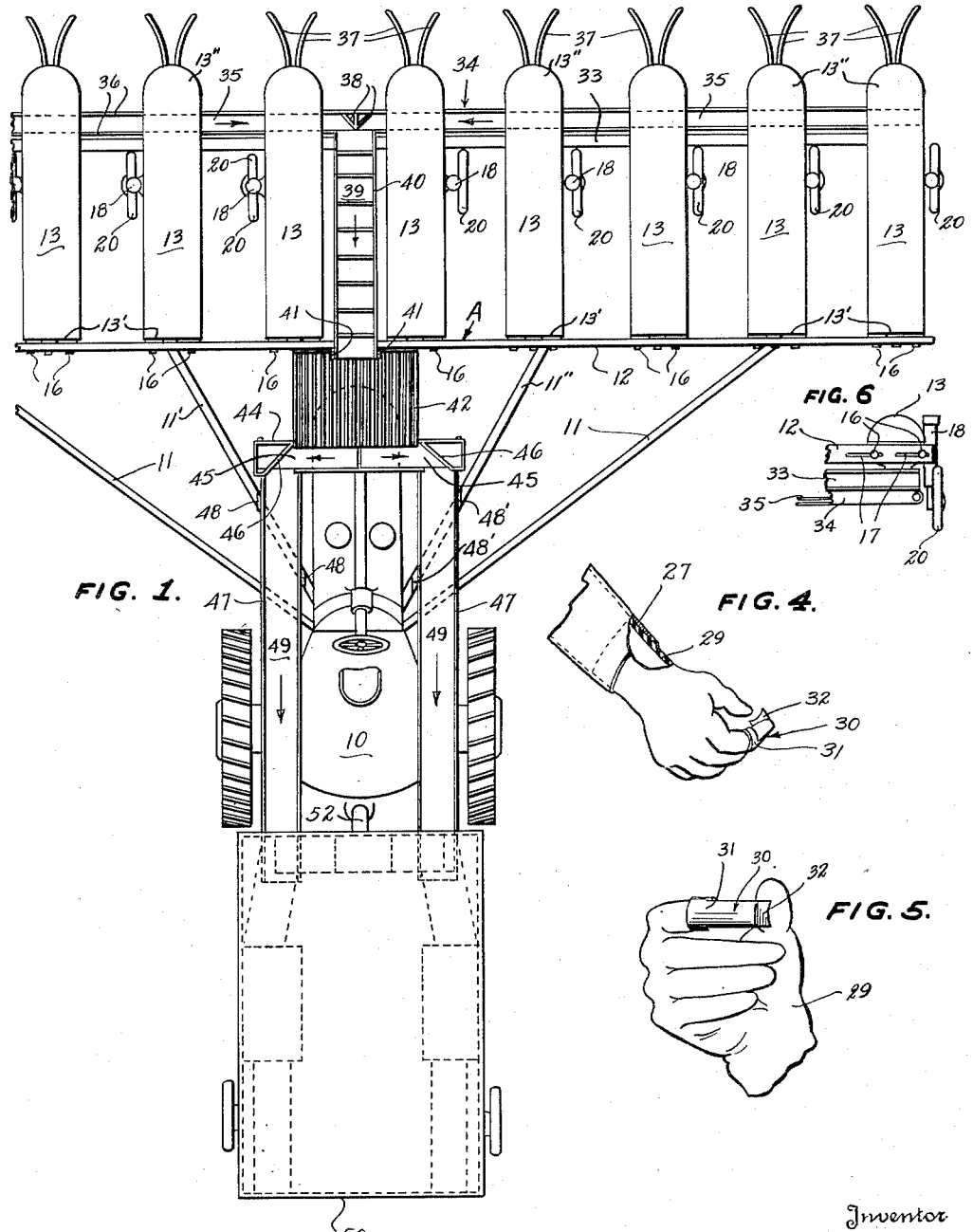
Figure 2:
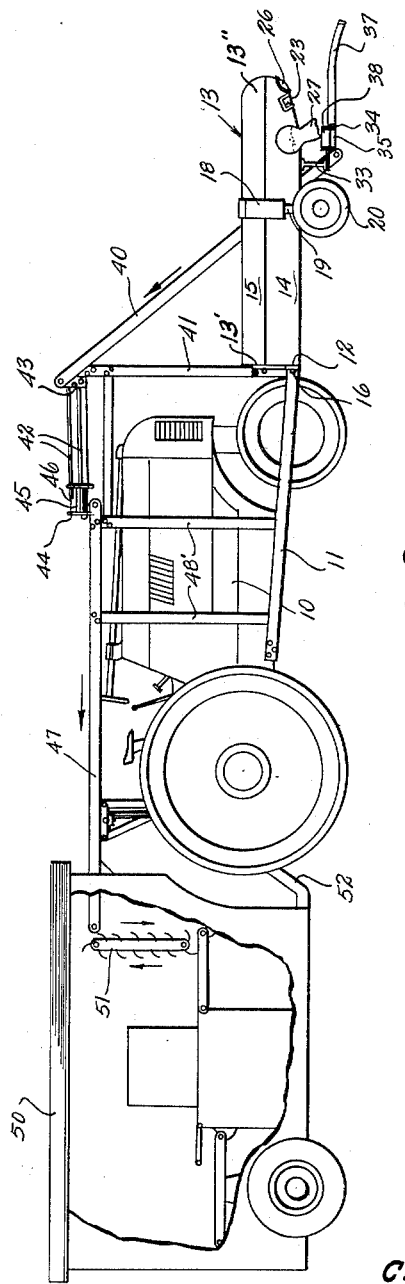
Figure 3:
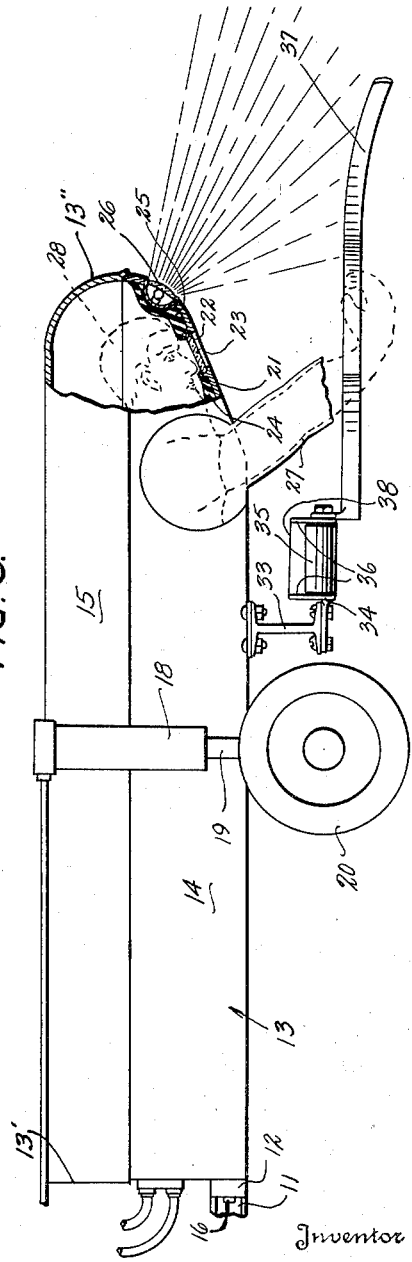

In the accompanying drawings, forming a part of this application, and in which like numerals are employed to designate like parts throughout the same, Figure 1 is a plan view of the harvester embodying my invention, parts broken away, Figure 2 is a side elevation of the same, Figure 3 is an enlarged side elevation of one of the picker or worker cells and associated elements removed, Figure 4 is a perspective view of a worker's gloved hand, and showing the forefinger provided with a picking or stem cutting implement, Figure 5 is a similar view illustrating the stem cutting implement, and, Figure 6 is a fragmentary rear elevation, on a reduced scale, showing means for adjusting the worker cells.

In the drawings, where for the purpose of illustration, is shown a preferred embodiment of my invention, the numeral 10 designates a conventional farm tractor, having the usual power take-off shaft for providing the motive force for the various conveyors and like elements to be described.

Suitably rigidly secured to the sides of the tractor main frame, and extending forwardly of the tractor and diverging forwardly outwardly with respect to the same, are substantially a pair of horizontal beams or braces 11 and horizontal beams 11' and 11'' disposed intermediate said pair of beams. The forward ends of the beams 11, 11', 11'', terminate at equal distances forwardly of the tractor, and rigidly secured to the forward ends of the beams is a long horizontal beam or support member 12, arranged at right angles to the longitudinal center line of the tractor and forming a frame. Arranged forwardly of the front end A of the frame or the support beam 12, at right angles to the same, and spaced transversely along the beam 12, are a plurality of elongated worker or picker supporting and enclosing cells 13. Any suitable number of cells 13 may be employed, and the maximum number that can be operated efficiently is preferable. Each cell 13 includes a lower horizontal worker supporting section 14, and an upper horizontal cover or closure section 15. The one or rear ends 13' of the cells 13 are adjustably secured to the support beam 12, by means of bolts 16, or the like, received by horizontal slots 17, formed in the beam 12, adjacent to the cells 13 and which extend through and are secured to the rear ends of said cells. Rigidly secured to the lower section 14 of each cell 13, at one side of the same, and near the longitudinal center of the cell, is a cylindrical vertical plunger chamber 18, adapted for receiving a vertical plunger shaft 19, carrying a suitable ground engaging cell support wheel 20. The plunger chambers 18 are adapted to be filled with suitable fluid, and they function as shock absorbers beneath the cells 13. The cells 13 can be raised and lowered separately vertically by draining or bleeding fluid from the chambers 18. Each cell adjacent its other end 13'' is provided with an inclined portion 21. Specifically, each lower section 14 has a forward upwardly inclined end surface 21, having an opening 22, for receiving and securing a suitable magnifying glass window 23, for facilitating picking berries, or the like. Each lower section 14 is further provided with a suitable body pad or cushion 24, and a head cushion 25, both of which are preferably formed of foam rubber, or the like, Each section 14 includes a suitable headlight 26, for illuminating the ground and plants at night, to facilitate night harvesting. Each section 14 includes a pair of arm sleeve extensions 27, preferably formed of rubber, or the like, and suitably secured to the cell sections 14, around suitable openings formed in the opposite sides of the cells, near their forward ends. In Figure 3, the numeral 28 designates a worker or picker, inside one of the cells 13, and in position for picking or harvesting berries, or the like.

The workers arms are inserted in the sleeve extensions 27, which extend downwardly near the wrists, to protect the arms, see Figure 4. The workers 28 wear rubber gloves 29, or the like, to protect their hands, and these gloves are overlapped by the lower or outer ends of the arm extensions 27, as shown in Figure 4. One of the fingers, preferably the forefinger, of each of the worker's hands is provided with a picking or stem cutting implement 30, including a generally cylindrical portion 31, for receiving the finger, and a laterally extending preferably curved sharp blade portion 32, to facilitate picking berries, or the like.

Suitably rigidly secured to the undersides of the cells 13, forwardly of the wheels 20, and parallel to the beam 12, is a long transverse I-beam 33, suitably rigidly secured to the lower surface of which is the support frame 34 for endless conveyor belts 35. The conveyor belts 35 are arranged longitudinally in opposed spaced relation, and they move in opposite directions inwardly, as illustrated in Figure 1. The vertical sides 36 of the conveyor belt support frame 34 extend above the belts 35, as shown in Figure 3. Suitably rigidly secured to the forward side 36 of the frame 34, at spaced intervals along such frame, and adjacent to the forward ends of the cells 13, are pairs of forwardly extending outwardly diverging foliage guide arms 37, for a purpose to be described.

Arranged adjacent to the inner opposed ends of the conveyor belts 35, at the transverse center of the harvester, and forming acute angles with the longitudinal edges of the belts 35, are deflectors or baffles 38. These deflectors 38 are arranged just above the upper runs of the conveyor belts 35, and are rigidly secured to the sides 36 of the frame 34.

Arranged at the transverse center of the harvester, parallel to the longitudinal center line of the tractor 10, and having its forward or take-up end adjacent to and arranged slightly beneath the inner opposed ends of the belts 35, is a rearwardly upwardly inclined endless conveyor 39. The endless conveyor 39 is supported by an inclined frame 40, the lower end of which is suitably rigidly secured to the frame 34, and the upper end of which is rigidly supported by vertically upstanding braces 41. The lower ends of the braces 41 are suitably rigidly secured to the beam 12.

Arranged adjacent to and slightly beneath the upper or discharge end of the conveyor 39, and at the transverse center of the harvester, are vertically spaced screens or riddles 42, which are slightly rearwardly downwardly inclined, and adapted for being vibrated or agitated under control of the driver of the tractor 10. Any suitable means may be employed for causing the riddles 42 to vibrate and if desired, the riddles may be stationary. The riddles 42 comprise closely spaced rods or bars, which permit the sorting or grading of the berries, or the like, which roll over them. The forward or take-up ends of the riddles 42 are supported by brackets or arms 43, suitably rigidly secured to the upper end of the frame 40, and the rear end of the riddles is supported upon a transverse horizontal conveyor belt frame 44. The frame 44 supports opposed spaced horizontal endless conveyor belts 45, which move laterally outwardly in opposite directions. Rigidly secured to the frame 44, near the outer ends of the same, arranged above the upper runs of the belts 45, near their outer or discharge ends, and forming acute angles with the longitudinal edges of the belts 45, are vertical deflectors or baffles 46. The conveyor belt frame 44 engages upon and is supported by horizontal transversely spaced rearwardly extending conveyor belt frames 47. The frames 47 have their forward ends rigidly secured to and supported by pairs of vertical braces or members 48, 48' respectively, the lower ends of which are suitably rigidly secured to and supported by the adjacent beams or braces 11' and 11'' respectively. The frames 47 carry rearwardly moveable parallel endless conveyor belts 49, the forward or take-up ends of which are arranged slightly beneath and forwardly of the rear discharge edges of the belts 45. The frames 47 and the conveyor belts 49 are arranged above the tractor 10, and the rear or discharge ends of the conveyor belts 49 extend through the forward wall of a suitable wheeled processing cabin or trailer 50. The rear ends of the frames 47 are suitably supported by the forward end or wall of the cabin 50. The rear or discharge ends of the conveyor belts 49, which extend into the processing cabin 50, are arranged to discharge berries, or the like, on to suitable vertical conveyor belts 51, within the cabin 50. The processing cabin or trailer 50 has a forward tongue 52, for connecting the cabin to the rear of the tractor 10.

The processing cabin or trailer 50 is provided with the necessary equipment for performing such processing operations as cleaning, stemming or hulling, grading, and packaging the produce being harvested. The necessary operators or workers for processing the harvested produce, working within the cabin 50, while the entire harvester moves forwardly. Variations in the processing equipment and fixtures, in the cabin 50, permits of its use for a variety of produce such as berries, tomatoes, peas, beans, peppers, radishes, and the like.

The operation of the harvester is as follows:

The tractor 10 is driven through a berry patch, or the like, and the cells 13 are adjusted laterally, by means of the slots 17, and associated elements, to arrange such cells directly over the rows of plants. The guides 37 crowd the berry bush foliage, or the like, together and upwardly, where such bushes are upstanding in position for being picked. The workers or pickers 28 pick berries, or the like, with both hands, using the implements 30 for cutting the stems. The workers place the picked berries onto the conveyor belts 35, where they will not roll off because of the upwardly extending sides 36. The berries are conveyed on the belts 35 inwardly, and engage against the deflectors 38, which cause them to discharge onto the inclined conveyor 39. The conveyor 39 discharges the berries, or the like, onto the riddles 42, which may be vibrated under control of the driver of the tractor 10. These riddles 42 allow any dirt particles, stems, extremely small berries, and the like, to sift through, or be graded out, and the acceptable produce work their way rearwardly down the top inclined riddle, and are discharged onto the conveyors 45, where they cannot roll off because of the sides of the frame 44. The conveyors 45 convey the berries outwardly, where they engage against the deflectors 46, which cause them to discharge onto the conveyor belts 49. These belts 49 convey the berries, or like produce, into the processing cabin 50, where additional workers process them to the point where they are ready for marketing, as before explained.

It will be noted that the invention provides a harvester wherein all conveyors, elevators and riddles are completely enclosed, thus serving to eliminate the entrance of dust, dirt, insects or the like, and preventing the deleterious effect of the heat of the sun on the produce after the same has been removed from the field.

It is to be understood that the form of my invention herewith shown and described, is to be taken as a preferred example of the same, and that various changes in the shape size and arrangement of parts may be resorted to, without departing from the spirit of my invention or the scope of the subjoined claims.

Having thus described my invention, what I claim is:

1. An attachment for supporting a plurality of workers in position to harvest produce in row crops during movement parallel to the rows comprising a horizontally-disposed frame, a plurality of horizontally-disposed worker holding cells arranged in side-by-side spaced relation along the front end of said frame and having one end secured to said frame, the bottom of each cell adjacent its other end being provided with an inclined portion, there being an opening in said inclined portion, a pad on opposed sides of said opening for supporting the head and body of the worker in position such that his eyes are in direct alignment with said opening, opposed sleeve extensions positioned below and spaced from the opening in each of the inclined portions of each of said cells and dependingly carried by the inclined portions of each of said cells for receiving the arms of the worker, wheels arranged adjacent said cells and hydraulically connected to the latter for movably supporting the cells against shock, and a pair of horizontally-projecting spaced diverging guide arms arranged below the other end of each of said cells and dependingly supported from said cell for crowding the produce in the adjacent rows together.

2. An attachment for supporting a plurality of workers in position to harvest produce in row crops during movement parallel to the rows comprising a horizontally-disposed frame, a plurality of horizontally-disposed worker holding cells arranged in side-by-side spaced relation along the front end of said frame and having one end secured to said frame, the bottom of each cell adjacent its other end being provided with an inclined portion, there being an opening in said inclined portion, a pad on opposed sides of said opening for supporting the head and body of the worker in position such that his eyes are in direct alignment with said opening, and opposed sleeve extensions positioned below and spaced from the opening in each of the inclined portions of each of said cells and dependingly carried by the inclined portions of each of said cells for receiving the arms of the worker.

3. An attachment for supporting a plurality of workers in position to harvest produce in row crops during movement parallel to the rows comprising a horizontally-disposed frame, a plurality of horizontally-disposed worker holding cells arranged in side-by-side spaced relation along the front end of said frame and having one end secured to said frame, the bottom of each cell adjacent its other end being provided with an inclined portion, there being an opening in said inclined portion, a pad on opposed sides of said opening for supporting the head and body of the worker in position such that his eyes are in direct alignment with said opening, opposed sleeve extensions positioned below and spaced from the opening in each of the inclined portions of each of said cells and dependingly carried by the inclined portions of each of said cells for receiving the arms of the worker, and horizontally-projecting means arranged below the other end of each of said cells and dependingly supported from said cell for crowding the produce in the adjacent rows together.

4. An attachment for supporting a plurality of workers in position to harvest produce in row crops during movement parallel to the rows comprising a horizontally-disposed frame, a plurality of horizontally-disposed worker holding cells arranged in side-by-side spaced relation along the front end of said frame and having one end secured to said frame, the bottom of each cell adjacent its other end being provided with an inclined portion, there being an opening in said inclined portion, a pad on opposed sides of said opening for supporting the head and body of the worker in position such this his eyes are in direct alignment with said opening, opposed sleeve extensions positioned below and spaced from the opening in each of the inclined portions of each of said cells and dependingly carried by the inclined portions of each of said cells for receiving the arms of the worker, and wheels arranged adjacent said cells and hydraulically connected to the latter for movably supporting the cells against shock.

CLIFFORD P. SIVERTSON.

REFERENCES CITED

The following references are of record in the file of this patent:

UNITED STATES PATENTS

| Number | Name | Date |
| --- | --- | --- |
| 885,569 | Bergquist | Apr. 21, 1908 |
| 1,015,299 | Cooper | Jan. 23, 1912 |
| 1,213,151 | Cayo | Jan. 23, 1917 |
| 1,715,304 | Ocker | May 28, 1929 |
| 1,918,697 | Gruss | July 18, 1933 |
| 1,926,338 | Johnston | Sept. 12, 1933 |
| 2,196,603 | Dunn | Apr. 9, 1940 |
| 2,267,234 | Garber | June 4, 1940 |

FOREIGN PATENTS

| Number | Country | Date |
| --- | --- | --- |
| 491,437 | France | June 3, 1919 |